(12) United States Patent
Tapsoba et al.

(10) Patent No.: US 10,562,083 B2
(45) Date of Patent: Feb. 18, 2020

(54) METHOD FOR TREATING POLLUTED SOIL BY A HYDRAULIC BINDER WITH MAYENITE PHASE

(71) Applicant: HOLCIM TECHNOLOGY LTD, Jona (CH)

(72) Inventors: Nouffou Tapsoba, Holderbank (CH); Eric Brouard, Holderbank (CH); Cédric Comparet, Holderbank (CH); Mohsen Ech, Holderbank (CH); Nicolas Richard, Holderbank (CH); Christophe Levy, Holderbank (CH)

(73) Assignee: HOLCIM TECHNOLOGY LTD, Jona (CH)

( * ) Notice: Subject to any disclaimer, the term of this patent is extended or adjusted under 35 U.S.C. 154(b) by 0 days.

(21) Appl. No.: 16/339,243

(22) PCT Filed: Oct. 4, 2017

(86) PCT No.: PCT/EP2017/075156
§ 371 (c)(1),
(2) Date: Apr. 3, 2019

(87) PCT Pub. No.: WO2018/065447
PCT Pub. Date: Apr. 12, 2018

(65) Prior Publication Data
US 2019/0224730 A1  Jul. 25, 2019

(30) Foreign Application Priority Data
Oct. 4, 2016  (FR) ...................... 16 59573

(51) Int. Cl.
*B09C 1/00* (2006.01)
*B09C 1/08* (2006.01)
*B09B 3/00* (2006.01)
*C04B 7/32* (2006.01)
*C04B 28/06* (2006.01)
*C04B 18/04* (2006.01)
*C04B 111/00* (2006.01)

(52) U.S. Cl.
CPC .............. *B09C 1/08* (2013.01); *B09B 3/0041* (2013.01); *C04B 7/32* (2013.01); *C04B 18/0472* (2013.01); *C04B 28/06* (2013.01); *C04B 28/065* (2013.01); *B09C 2101/00* (2013.01); *C04B 2111/00732* (2013.01); *C04B 2111/00767* (2013.01); *Y02W 30/91* (2015.05)

(58) Field of Classification Search
CPC ....................................................... B09C 1/08
See application file for complete search history.

(56) References Cited

U.S. PATENT DOCUMENTS

| 3,826,665 | A | 7/1974 | Hovasse et al. |
| 9,676,014 | B2 * | 6/2017 | Moudilou ........... C04B 40/0028 |
| 2015/0158063 | A1 | 6/2015 | Moudilou et al. |

FOREIGN PATENT DOCUMENTS

| EP | 0 588 689 A1 | 3/1994 |
| JP | H10-279937 A | 10/1998 |
| JP | 2006-272144 A | 10/2006 |

OTHER PUBLICATIONS

Preliminary Search Report as issued in French Patent Application No. 1659573, dated Jun. 9, 2017.
International Search Report as issued in International Patent Application No. PCT/EP2017/075156, dated Oct. 27, 2017.

* cited by examiner

*Primary Examiner* — Janine M Kreck
(74) *Attorney, Agent, or Firm* — Pillsbury Winthrop Shaw Pittman LLP

(57) ABSTRACT

A method for treating polluted soils, includes mixing the soil with a hydraulic binder, wherein the hydraulic binder includes: as the only high-alumina clinker, a high-alumina clinker including more than 80 wt % of mayenite C12A7 phase or a mayenite isotope, the high-alumina clinker making up at least 70 wt % of the weight of the hydraulic binder; and 1 wt % to 30 wt %, relative to the total weight of the binder, of lime.

13 Claims, No Drawings

METHOD FOR TREATING POLLUTED SOIL BY A HYDRAULIC BINDER WITH MAYENITE PHASE

CROSS-REFERENCE TO RELATED APPLICATIONS

This application is the U.S. National Stage of International Application Serial No. PCT/EP2017/075156, filed Oct. 4, 2017, which in turn claims priority to French Application No. 1659573, filed Oct. 4, 2016. The contents of all of these applications are incorporated herein by reference in their entirety.

FIELD

The present invention relates to a process for treating polluted soil with a hydraulic binder containing mainly mayenite (C12A7) and the use thereof in the treatment of polluted soils.

A subject matter of the present invention is a hydraulic binder essentially containing an anhydrous calcium aluminate—the mayenite of formula $12CaO.7Al_2O_3$ (C12A7 in cement notation—and quicklime (CaO) or hydrated lime $(Ca(OH)_2)$. The present invention also relates to the use of this binder in the treatment of a material, in particular soil or earth, polluted or contaminated by ionic chemical species or heavy metals. The treated material remains loose but leaching of polluting species is reduced, even in the long term.

BACKGROUND

Soil remediation is a growing demand and is accompanied by major challenges in terms of public health and environmental protection.

When soluble pollutants are released following contact with water there is a significant potential risk of environmental pollution during short-term or final storage, or when contaminated soil is reused.

To limit this risk, the landfilling of contaminated soil requires first that the hazard class of the soil be lowered.

Lowering the hazard class can also allow the treated soil to be reused, for example in road sub-bases or in embankments.

Lowering the hazard class of contaminated soils is equivalent to lowering the level of water-leachable pollutants.

Hydraulic binders are already used to treat contaminated waste or soil. Anionic pollutants, such as sulfates or heavy metals, present in contaminated soil can be trapped during the hydration process of a hydraulic binder mixed with the soil to be treated and with water. These elements can be trapped in hydrates of type C-S-H (calcium-silicate-hydrate) or sulfoaluminates of type ettringite or calcium monosulfoaluminate. Some elements can also be stabilized as hydroxides.

In application EP 0 588 689, Kerneos describes the use of binders containing active alumina to treat municipal waste incineration residues. The main mineralogical phases of these aluminous cements are CA or CA and C12A7 or C3A and C12A7.

In these binders, sulfate binding is based on the formation of calcium sulfoaluminate hydrate, mainly ettringite. However, these binders themselves provide sulfates or their reactivity remains limited, which limits the rapid and significant binding of sulfate ions.

SUMMARY

The invention aims to provide a hydraulic binder that traps anions such as sulfate ions and/or heavy metals quickly and in large quantity and thus makes it possible to treat soils contaminated with such pollutants, while also limiting their leaching. The quantities of binder added can be small, which also reduces the treatment cost relative to the binders and processes of the prior art.

The invention also aims to provide a hydraulic binder allowing polluted soil to be treated and rendered inert in a single step and in situ, meaning not requiring transfer to another location.

These objectives are achieved by using a hydraulic binder comprising a large proportion of calcium aluminate of type mayenite C12A7 and quicklime or hydrated lime. The proportion of alumina and calcium provided by the binder optimizes the formation and stabilization of ettringite.

In cement notation, primary compounds are represented by C for CaO, S for $SiO_2$, A for $Al_2O_3$, \$ for $SO_3$, F for $Fe_2O_3$, which will be used throughout the present text, unless otherwise indicated.

Mayenite is an anhydrous calcium aluminate of formula $12CaO.7Al_2O_3$ (hereinafter "C12A7") and has a crystal structure composed of three-dimensionally bonded voids (cages) comprising "free oxygen ions". These free oxygen ions may be substituted by anions at room temperature. Thus, for the purposes of the present invention, the C12A7 phase includes any isotypic structure of C12A7, such as $C11A7.CaF_2$ (here F refers to fluorine), the structure of which results from a substitution of $O^{2-}$ ions by $F^-$ ions. Hereinbelow, C12A7 must be understood to mean C12A7 or any isotypic structure, particularly $C11A7.CaF_2$ (here F denotes fluorine) and $C11A7.CaCl_2$.

Thanks to the high reactivity of the binder and the rate of ettringite formation, pollutants are quickly stabilized in large quantities. Moreover, thanks to the rapid consumption of pollutants, depolluted soils are treated faster than with the other binders mentioned above. One of the putative mechanisms is the high C12A7 content of the binder and the absence of sulfate as described above.

The anionic pollutants—such as sulfates—or heavy metals present in contaminated soil are chemically trapped in calcium trisulfoaluminate hydrates that result from hydration of the hydraulic binder of the invention mixed in the presence of the sulfates in the soil and water. At room temperature, these phases are thermodynamically stable; pollutants, and in particular sulfates, are thus permanently trapped and the risks of leaching are significantly reduced.

The subject matter of the invention is a process for treating polluted soils, in particular soils polluted by anions, such as sulfate ions, and/or heavy metals, comprising mixing said soil with a hydraulic binder, characterized in that the hydraulic binder comprises:

As the sole aluminous clinker, an aluminous clinker comprising more than 80% by mass of mayenite C12A7 phase or a mayenite isotype;

From 1 to 30% by weight, relative to the total weight of the binder, of quicklime or hydrated lime.

DETAILED DESCRIPTION

An "aluminous clinker" is a clinker comprising at least one phase selected from C3A, CA, C12A7, C11A7CaF2, C4A3\$ (ye'elimite), C2A(1-x)Fx (with x a member of]0, 1]), amorphous hydraulic phases having a C/A molar ratio comprised between 0.3 and 15 and such that the total Al2O3 contents of these phases are comprised between 3 and 70% by total weight of the hydraulic binder, preferentially between 7 and 50% by weight and better between 20 and 30% by weight. In the context of the invention, the aluminous clinker comprises more than 80% by weight of mayenite C12A7 phase or a mayenite isotype.

Advantageously, the aluminous clinker of the invention comprises the mayenite C12A7 phase as the sole aluminate phase.

The aluminous clinker of the invention advantageously comprises more than 85% by mass of mayenite phase, more advantageously more than 90% by mass of mayenite phase, even more advantageously more than 95% by mass of mayenite phase.

The aluminous clinker of the invention may comprise up to 99% by mass of mayenite phase, or even 100% by mass. Clinkers with higher C12A7 contents produce a larger amount of ettringite.

The aluminous clinker of the invention is obtained by melting or sintering, at a temperature between about 1250 and 1300° C., a mixture of white bauxite and limestone. Low levels of silica and iron in the raw materials ensure an optimal level of C12A7. Advantageously, the cumulative iron and silica content must be below 30%, even more advantageously below 20%, by weight relative to the total weight of the raw materials.

Advantageously, the hydraulic binder mainly contains, by weight, the aluminous clinker of the invention. This clinker advantageously represents at least 70% by weight of the total weight of the binder, more advantageously at least 75% by weight. The C12A7 content may vary between 60% and 90% by weight in the binder, more advantageously between 65% and 90% by weight, even more advantageously between 70% and 90%, even more advantageously between 75% and 90% by weight, even more advantageously between 80% and 90% by weight.

The hydraulic binder of the invention also comprises lime. This lime may be free lime (CaO), slaked lime $(Ca(OH)_2)$, or a mixture of free lime and slaked lime in any proportion. In one embodiment, the lime is slaked lime.

The hydraulic binder of the invention may be produced by separate grinding and then mixing of the aluminous clinker and the quicklime or hydrated lime, or by co-grinding all the components.

The addition of lime to the hydraulic binder improves the trapping of pollutants, even over time.

In one embodiment, the hydraulic binder of the invention advantageously comprises from 5 to 25% by weight, relative to the total weight of the binder, of quicklime or hydrated lime. Advantageously, the hydraulic binder of the invention has a C12A7/CaO mass ratio ranging from 65/35 to 99/1, more advantageously from 65/35 to 90/10, even more advantageously from 85/15.

In another embodiment, the hydraulic binder of the invention advantageously comprises from 10 to 25% by weight, relative to the total weight of the binder, of quicklime or hydrated lime.

The hydraulic binder of the invention may also contain known setting accelerators for aluminous cements. Examples include soluble lithium salts, such as lithium nitrate, lithium chloride or lithium hydroxide, or mixtures thereof. Hydroxylated organic compounds such as those cited in U.S. Pat. No. 3,826,665 may also be used.

In a preferred embodiment of the invention, the hydraulic binder comprises only the aluminous clinker of the invention and quicklime or slaked lime.

The hydraulic binder may be ground and/or separated from the lime to obtain a binder with a Blaine specific surface of between 2500 $cm^2/g$ and 5000 $cm^2/g$.

The process of treating the soil with said hydraulic binder quickly creates stable chemical species within the polluted soil. The soil thus treated remains easily to handle (to shovel, to transport). The treatment does not require logistically-burdensome handling, meaning it does not require transport of a large volume of materials (soil or binder) or special infrastructures. The treatment provided is simple to carry out, economically advantageous and environmentally attractive.

The process according to the invention advantageously comprises mixing said soil with said hydraulic binder in soil/binder mass proportions comprised between 1 and 10 parts binder per 100 parts soil, more advantageously comprised between 3 and 7 parts binder per 100 parts soil.

To optimize the formation of ettringite in the material to be treated, the binder must be distributed uniformly and the amount of water in the soil sufficient to optimize the formation of ettringite. In practice, this results in a water content that may be comprised between 5% and 40% by weight, more advantageously 15% and 40%, relative to the weight of the soil, depending on its nature. If necessary, water may be added to the soil. The quantities of water must be sufficient to allow the hydration reaction and may easily be determined by the skilled person.

The contaminated soils are advantageously soils contaminated with significant amounts of sulfates.

The process according to the present invention may advantageously be used to stabilize polluted soils in situ or before storage, in particular soils polluted by sulfate anions and/or heavy metal cations.

EXPERIMENTAL PROTOCOLS

Mineralogical Analysis of a Clinker:

The quantitative mineralogical analysis of a clinker is performed by Rietveld analysis of the X-ray diffraction spectrum of said clinker. The clinker sample to be analyzed is finely ground to provide a sample in which all the particles pass through a sieve with a mesh size of 63 μm. The reference X-ray diffraction spectra of the crystalline phases present in the sample to be analyzed (with the exception of the glass phase which does not have a well-defined spectrum) are obtained from pure samples of said phases.

Leaching Tests

The tests were all conducted in accordance with the recommendations of standard NF EN-12457-2, December 2002.

The tests are carried out on a material in which at least 95% of the particles (by mass) have a size of less than 4 mm.

For analyses and leaching tests, the dry matter (DM) mass of the sample is determined after heating in a 105° C.±5° C. oven to constant weight in accordance with ISO 11465, August 1994.

From the test specimen, a test sample with a total wet mass containing exactly 0.090 kg±0.005 kg (measured with an accuracy of 0.1 g) of dry matter is prepared.

The leaching test is carried out at room temperature, i.e. 20° C.±5° C.

The wet test sample with a total mass corresponding to 0.090 kg±0.005 kg of dry matter is placed in a bottle and a quantity of leachant (distilled water, demineralized water, deionized water or water of equivalent purity having a pH comprised between 5 and 7.5, conductivity less than 0.5 mS/m) is added to obtain a liquid-solid ratio of 10 L/kg±2%.

The capped bottle is placed in an agitation device (as defined in the standard) and agitated at roughly 10 rpm for 24 hours±0.5 h. To achieve a good chemical equilibrium between the solid and the solution, it is important during extraction to avoid settlement of solids.

In addition to the samples, leaching "blanks" are also prepared.

After stopping the agitation, the suspended solids are allowed to settle for 15 minutes±5 min, then filtered under vacuum through a 0.45 µm membrane filter.

If filtration is made too difficult, the eluate may be centrifuged at 2000 g for 30 minutes to avoid clogging the 0.45 µm filter. The conditions are specified in standard NF EN-12457-2, December 2002.

The eluate is then divided into an appropriate number of sub-samples for different chemical analyses and stored according to EN ISO 5667-3.

The analysis of the eluate produced by the leaching test provides the concentration of the constituents in the eluates, expressed in mg/L. The final results are expressed as the amount of constituent leached relative to the total mass of the sample, in mg/kg of dry matter.

The quantity of a constituent leached from the material, based on the dry mass of the original material, is calculated using the following formula:

$$A = C \times [(L/MD) + (MC/100)] \quad (1)$$

where:

A is the release of a constituent at a L/S=10 (in milligrams per kilogram of dry matter);

C is the concentration of a particular constituent in the eluate (in milligrams per liter);

L is the volume of leachant used (in liters);

MC is the moisture content, expressed as a percentage of the dry mass (4.3.2) and calculated as follows: MC=100× (MW−MD)/MD MD is the mass of the dried test sample expressed in kilograms MW is the mass of undried test sample expressed in kilograms Analysis of Anions Anions are analyzed by ion chromatography with 1 mM $NaHCO_3$ and 3.5 mM $Na_2CO_3$ solutions as eluent.

Standard solutions for the ions $F^-$, $NO_2^-$, $NO_3^-$ and $Br$ are prepared.

Analysis of Heavy Metals

Elements (heavy metals) are analyzed by ICP-AES (inductively coupled plasma atomic emission spectroscopy).

RF power: 1.3 kW

Plasma flow rate: 15 L/min

Auxiliary flow rate: 2.25 L/min

Nebulizer flow rate: 0.8 L/min

Reading time per replicate: 20 s

The following non-limiting examples illustrate exemplary embodiments of the invention.

Unless otherwise indicated, all percentages are mass percentages.

In all tables:

DM=dry matter

ND: Not Detectable, meaning below the detection limit of the measurement

Example 1: Treatment of Soils Contaminated by Different Sulfate Contents with Binders According to the Invention or Comparative Binders The process for treating contaminated soils was carried out with binders of the invention and comparative binders.

Three materials to be treated were used: two supragypseous marls with two levels of pollution and a Roissy silt polluted by natural gypsum.

One supragypseous marl contained a sulfate $SO_4$ content of 5220 mg/kg of dry matter, another supragypseous contained a sulfate $SO_4$ content of 7000 mg/kg of dry matter and a silt having a sulfate content partly provided by a natural gypsum of 15060 mg/kg of dry matter.

The following binders were tested:

C12A7-based binder: binders according to the invention

CEM I binder: comparative binder based on Portland clinker

CSA binder: comparative binder based on calcium sulfoaluminate (CSA) clinker

The compositions of these binders are described below.

1. Preparation of Clinkers 1.1 Clinkers According to the Invention

Aluminous clinker is obtained by melting, at a temperature between about 1250 and 1300° C., a mixture of white bauxite and limestone. The silica and iron content of the raw materials should be as low as possible to ensure an optimal level of C12A7.

After firing, the clinker is cooled in ambient air, then ground to a Blaine fineness of about 3500 cm²/g and a particle size of less than about 100 µm. The mineralogical composition (% by mass) of the aluminous clinker according to the invention is presented in the following table.

TABLE 1

Mineralogical composition of C12A7 clinker with 98% purity (in mass percentage)

| | |
|---|---|
| C3S (cement notation) | ND |
| C2S (cement notation) | ND |
| C3A (cement notation) | ND |
| C4AF (cement notation) | ND |
| C4A3$ (cement notation) | ND |
| C12A7 (cement notation) | 98 |
| S (cement notation) | ND |
| MgO | ND |
| C2AS (cement notation) | ND |
| $CaSO_4$ | ND |
| Iron perovskite | ND |
| Other minority phases | 2 |

TABLE 2

Mineralogical composition of C12A7 clinker with 85% purity (in mass percentage)

| | |
|---|---|
| C3S (cement notation) | ND |
| C2S (cement notation) | ND |
| C3A (cement notation) | ND |
| C4AF (cement notation) | ND |
| C4A3$ (cement notation) | ND |
| C12A7 (cement notation) | 85 |
| S (cement notation) | 13 |
| MgO | ND |
| C2AS (cement notation) | ND |
| $CaSO_4$ | ND |
| Iron perovskite | ND |
| Other minority phases | 2 |

1.2 Comparative Test Clinkers 1.2.1 As a first comparative clinker, a commercial clinker, CEM I 52.5 N CE CP2 NF as produced by the Lafarge cement plant in Saint-Pierre-La-Cour, was used. This clinker is hereinafter referred to as CEM I.

CEM I 52.5 N CE CP2 NF clinker has a Blaine fineness of about 3900 cm²/g and a particle size of less than about 100 micrometers.

The mineralogical composition of CEM I clinker is presented in the following table.

TABLE 3

Chemical composition of CEM I clinker (in mass percentage)

| Component | Mass percentage |
|---|---|
| $SiO_2$ | 20.07 |
| $Al_2O_3$ | 4.95 |
| $Fe_2O_3$ | 2.96 |
| CaO | 63.89 |
| MgO | 0.89 |
| $K_2O$ | 1.06 |
| $Na_2O$ | 0.25 |
| $SO_3$ | 3.41 |
| $TiO_2$ | 0.19 |
| $Mn_2O_3$ | 0.14 |
| $P_2O_5$ | 0.27 |
| $Cr_2O_3$ | <LD |
| $ZrO_2$ | 0.02 |
| SrO | 0.02 |
| Loss on ignition | 1.56 |

LD = limit of detection 1.2.2 As a second comparative clinker, a sulfoaluminate clinker comprising about 60% by mass of ye'elimite phase was used. This clinker is hereinafter referred to as CSA.

The sulfoaluminate clinker is prepared in two steps:
preparation of a raw mixture comprising a mixture of raw materials previously selected so that the chemical composition of the raw mixture corresponds to the chemical composition of the desired clinker;
firing the raw mixture to obtain the clinker, in an optionally rotary kiln, at a temperature comprised between 1100° C. and 1300° C. to be adjusted according to the chemical composition of the raw mixture.

After firing, the clinker is cooled in ambient air, then ground to a Blaine fineness of about 5240 $cm^2$/g and a particle size of less than about 300 micrometers.

The mineralogical composition of CSA clinker is presented in the following table.

TABLE 4

Mineralogical composition of CSA clinker (in mass percentage)

| Phase | Mass percentage |
|---|---|
| C3S (cement notation) | ND |
| C2S (cement notation) | 22.7 |
| C3A (cement notation) | ND |
| C4AF (cement notation) | 1.9 |
| C4A3$ (cement notation) | 65.2 |
| C12A7 (cement notation) | 0 |
| MgO | 1.3 |
| C2AS (cement notation) | 1.3 |
| $CaSO_4$ | 0.8 |
| Iron perovskite | 6.3 |
| Other minority phases | 0.2 |

Three binders are then prepared by adding slaked lime ("Fleur de Chaux" HX80 Saint Hilaire) to each of these binders.

2. Treatment Process

Samples of contaminated soil are treated by the process according to the invention with hydraulic binders prepared beforehand according to the following protocol:
A quantity of wet soil equivalent to 600 g dry soil is introduced into a Perrier type mixer.
"Wet" means the natural moisture content of the soil, which may be adjusted to optimize the hydration of the binder. The water content may be comprised between 5% and 40% of the weight of the soil, depending on its nature.

The binder for the treatment is introduced on the surface and then the whole is mixed, at low speed, for at least 2 minutes until a mixture homogeneous in color and texture is obtained.

The whole of the treated material is extracted from the bowl and stored for 1 hour in an airtight bag.

After one hour, the whole was passed over a 4 mm sieve. Oversized material is broken by hand or with a tool so that all the treated material passes through a 4 mm sieve.

The whole of the sieved material is placed back into the airtight bag to prevent the material from drying.

The treated soil is allowed to mature over a period of 2 hours, 1 day, 7 days or 2 months at room temperature.

3. Results of the Leaching Tests

The results are reported in the following tables in which the percentages are expressed by weight of each of the components of the binder relative to the weight of material to be treated. The tests were carried out on the three types of materials described above.

TABLE 5

Sulfate content in low-sulfate marl treated with a binder according to the invention and compared with CSA binder + 1% $Ca(OH)_2$

| | Sulfate content (mg/kg DM) | | | |
|---|---|---|---|---|
| Duration of treatment | 2 hours | 1 day | 7 days | 2 months |
| Control (untreated) Supragypseous Marl | 5220 | 5220 | 5220 | 5220 |
| Comparative: 4.5% CEM I + 1% $Ca(OH)_2$ | 2790 | 3060 | 3180 | 2990 |
| Comparative: 4.5% CSA + 1% $Ca(OH)_2$ | 480 | 570 | 650 | 610 |
| Invention: 3.5% C12A7 (with 98% purity) + 0.6% $Ca(OH)_2$ | 64.7 | 62 | 51 | 97 |

Leaching tests carried out on a supragypseous marl with 7000 mg/kg $SO_4$ with different binder compositions corresponding to the invention.

TABLE 6

Sulfate content in high-sulfate marl treated with different binders according to the invention

| | Sulfate content (mg/kg DM) | | |
|---|---|---|---|
| Duration of treatment | 2 hours | 1 day | 7 days |
| Control (untreated) Supragypseous marl | 7000 | 7000 | 7000 |
| 0.98% C12A7 (with 85% purity) + 0.12% $Ca(OH)_2$ | 5980 | 6143 | 5390 |
| 2.65% C12A7 (with 85% purity) + 0.33% $Ca(OH)_2$ | 660 | 860 | 830 |
| 2.6% C12A7 (with 98% purity) + 0.4% $Ca(OH)_2$ | 290 | 610 | 770 |
| 4.8% C12A7 (with 98% purity) + 0.79% $Ca(OH)_2$ | 19 | 80 | 200 |
| 4.8% C12A7 (with 98% purity) + 0.6% $Ca(OH)_2$ | 20 | 70 | 160 |
| 4.8% C12A7 (with 98% purity) + 0.05% $Ca(OH)_2$ | 30 | 100 | 210 |
| 6.1% C12A7 (with 98% purity) + 0.92% $Ca(OH)_2$ | 30 | 40 | 100 |
| 8.8% C12A7 (with 98% purity) + 1.19% $Ca(OH)_2$ | 20 | 20 | 30 |
| 7% C12A7 (with 98% purity) + 3.4% $Ca(OH)_2$ | 20 | 20 | 20 |

TABLE 7

Sulfate content in high-sulfate silt treated with different binders according to the invention

| | Sulfate content (mg/kg DM) | | | |
|---|---|---|---|---|
| Duration of treatment | 2 hours | 1 day | 7 days | 2 months |
| Control (untreated) Silt with gypsum added | 15060 | 15060 | 15060 | 15060 |
| Comparative: 6% CEM I + 2.5% Ca(OH)$_2$ | 9610 | 9770 | 8060 | 6690 |
| Comparative: 6% CSA + 2.5% Ca(OH)$_2$ | 650 | 1040 | 1570 | 2180 |
| Invention: 6% C12A7 (with 98% purity) + 0.8% Ca(OH)$_2$ | 67 | 99 | 237 | 300 |

These results show the effectiveness of C12A7 binder+ lime in the process according to the invention: it is able to remove nearly all sulfates present in the soil, whether contaminated with low or high levels. In addition, the amount of binder used to decontaminate soils is lower than that required with other conventional binders.

Example 2: Influence of Lime Concentration

In this example, we used the C12A7 clinker described in Example 1 supplemented with different amounts of slaked lime (as described in Example 1). The hydraulic binders tested include only this C12A7 clinker and this slaked lime at the contents indicated in the following table.

The treatment process is identical to the process described in Example 1 and the material to be treated is the low-sulfate soil (5220 mg/kg of dry matter) described in Example 1. The results are reported in the following table in which the percentages are expressed by weight of each of the components of the binder relative to the weight of the material to be treated.

TABLE 8

Sulfate content in low-sulfate marl treated with different binders according to the invention, as a function of lime content

| | Sulfate content (mg/kg DM) | | | |
|---|---|---|---|---|
| Duration of treatment | 2 hours | 1 day | 7 days | 2 months |
| Control (untreated) | 5220 | 5220 | 5220 | 5220 |
| Comparative: 3.5% C12A7 + 0% Ca(OH)$_2$ | 160 | 280 | 600 | 1240 |
| Invention: 3.5% C12A7 (with 98% purity) + 0.43% Ca(OH)$_2$ | 70 | 54 | 53 | 143 |
| Invention: 3.5% C12A7 (with 98% purity) + 0.6% Ca(OH)$_2$ | 64.7 | 62 | 51 | 97 |
| Invention: 3.5% C12A7 (with 98% purity) + 1% Ca(OH)$_2$ | 70 | 80 | 120 | 210 |

These results show that the addition of lime significantly improves the efficiency of C12A7 clinker.

Example 3: Impact of the Treatment on the Presence of Heavy Metals in the Leachant Conventionally, treatment with traditional binders may potentially provide very small quantities of leachable heavy metals such as hexavalent chromium (chromium VI). The present invention limits the supply of such compounds, including chromium VI. This is mainly due to the nature of the raw materials used in its manufacture and to the process used. The objective is therefore to limit the supply of this type of compound by the binder in order to meet the very low leaching thresholds for the disposal of treated waste or materials. For example, the acceptable threshold for considering a material inert under the regulation is 0.5 mg/kg of chromium VI relative to the dry material.

The tables below summarize the chromium VI contents found following leaching tests on all the treatments presented in the previous examples.

TABLE 9

Chromium VI content in supragypseous marl treated with a binder according to the invention (3.5% C12A7 with 98% purity + 0.6% Ca(OH)$_2$) and compared with a CEM I-based binder and a CSA-based binder

| | Hexavalent chromium content (mg/kg DM) | | | |
|---|---|---|---|---|
| Duration of treatment | 2 hours | 1 day | 7 days | 2 months |
| Control (untreated) Supragypseous Marl | ND | ND | ND | ND |
| Comparative: 4.5% CEM I + 1% Ca(OH)$_2$ | 0.8 | 0.6 | 0.4 | 0.3 |
| Comparative: 4.5% CSA + 1% Ca(OH)$_2$ | 1.8 | 2.0 | 2.2 | 2.0 |
| Invention: 3.5% C12A7 (with 98% purity) + 0.6% Ca(OH)$_2$ | ND | ND | ND | ND |

TABLE 10

Chromium VI content in supragypseous marl treated with different binders according to the invention (3.5% C12A7 with 98% purity + 0.6% Ca(OH)$_2$) as a function of lime content in the binder

| | Chromium VI content (mg/kg DM) | | |
|---|---|---|---|
| Duration of treatment | 2 hours | 1 day | 7 days |
| Control (untreated) Supragypseous marl | ND | ND | ND |
| 0.98% C12A7 (with 85% purity) + 0.12% Ca(OH)$_2$ | ND | ND | ND |
| 2.65% C12A7 (with 85% purity) + 0.33% Ca(OH)$_2$ | 0.1 | 0.2 | 0.1 |
| 2.6% C12A7 (with 98% purity) + 0.4% Ca(OH)$_2$ | 0.1 | 0.2 | 0.2 |
| 4.8% C12A7 (with 98% purity) + 0.79% Ca(OH)$_2$ | ND | ND | 0.1 |
| 4.8% C12A7 (with 98% purity) + 0.6% Ca(OH)$_2$ | ND | ND | 0.1 |
| 4.8% C12A7 (with 98% purity) + 0.05% Ca(OH)$_2$ | ND | 0.1 | 0.2 |
| 6.1% C12A7 (with 98% purity) + 0.92% Ca(OH)$_2$ | ND | ND | ND |
| 8.8% C12A7 (with 98% purity) + 1.19% Ca(OH)$_2$ | ND | ND | ND |
| 7% C12A7 (with 98% purity) + 3.4% Ca(OH)$_2$ | ND | ND | ND |

TABLE 11

Chromium VI content in silt treated with a binder according to the invention (3.5% C12A7 with 98% purity + 0.6% Ca(OH)$_2$) and compared with a CSA-based binder and a CEM I-based binder

| Duration of treatment | Chromium VI content (mg/kg DM) | | | |
|---|---|---|---|---|
| | 2 hours | 1 day | 7 days | 2 months |
| Control (untreated) Silt with gypsum added | ND | ND | ND | ND |
| Comparative: 6% CEM I + 2.5% Ca(OH)$_2$ | 0.8 | 0.8 | 0.7 | 0.7 |
| Comparative: 6% CSA + 2.5% Ca(OH)$_2$ | 1.2 | 1.7 | 2.0 | 2.7 |
| Invention: 6% C12A7 (with 98% purity) + 0.8% Ca(OH)$_2$ | ND | ND | ND | ND |

All these results position the binder of the invention as an advantageous and effective solution to the problem of leaching of chromium VI supplied by traditional OPC or CSA binders.

The invention claimed is:

1. A method for treating polluted soils, comprising mixing said soil with a hydraulic binder, wherein the hydraulic binder comprises:
   as the sole aluminous clinker, an aluminous clinker comprising more than 80% by mass of mayenite C12A7 phase or a mayenite isotype, said aluminous clinker represents at least 70% by weight of the weight of the hydraulic binder;
   from 1 to 30% by weight, relative to the total weight of the binder, of lime.

2. The method according to claim 1, wherein the aluminous clinker comprises as the sole aluminate phase the mayenite C12A7 phase.

3. The method according to claim 1, wherein the lime is free lime, slaked lime, or a mixture of free lime and slaked lime.

4. The method according to claim 1, wherein the hydraulic binder comprises from 5 to 25% by weight, relative to the total weight of the binder, of quicklime or slaked lime.

5. The method according to claim 1, comprising mixing said soil with said hydraulic binder in soil/binder mass proportions comprised between 1 and 10 parts binder per 100 parts soil.

6. A method to stabilize soils in situ or before storage, comprising mixing said soil with a hydraulic binder, wherein the hydraulic binder comprises:
   as the sole aluminous clinker, an aluminous clinker comprising more than 80% by mass of mayenite C12A7 phase or a mayenite isotype, said aluminous clinker represents at least 70% by weight of the weight of the hydraulic binder;
   from 1 to 30% by weight, relative to the total weight of the binder, of lime.

7. The method according to claim 1, wherein said polluted soils are polluted by anions and/or heavy metals.

8. The method according to claim 7, wherein said anions are sulfate ions.

9. The method according to claim 3, wherein the lime is slaked lime.

10. The method according to claim 6, wherein said soils are polluted by anions and/or heavy metals.

11. The method according to claim 6, wherein the aluminous clinker comprises as the sole aluminate phase the mayenite C12A7 phase.

12. The method according to claim 6, wherein the hydraulic binder comprises from 5 to 25% by weight, relative to the total weight of the binder, of quicklime or slaked lime.

13. The method according to claim 6, comprising mixing said soil with said hydraulic binder in soil/binder mass proportions comprised between 1 and 10 parts binder per 100 parts soil.

* * * * *